(No Model.) 7 Sheets—Sheet 2.

A. McDONALD.
EXCAVATOR.

No. 547,672. Patented Oct. 8, 1895.

WITNESSES:

INVENTOR
A. McDonald
BY Munn & Co
ATTORNEYS.

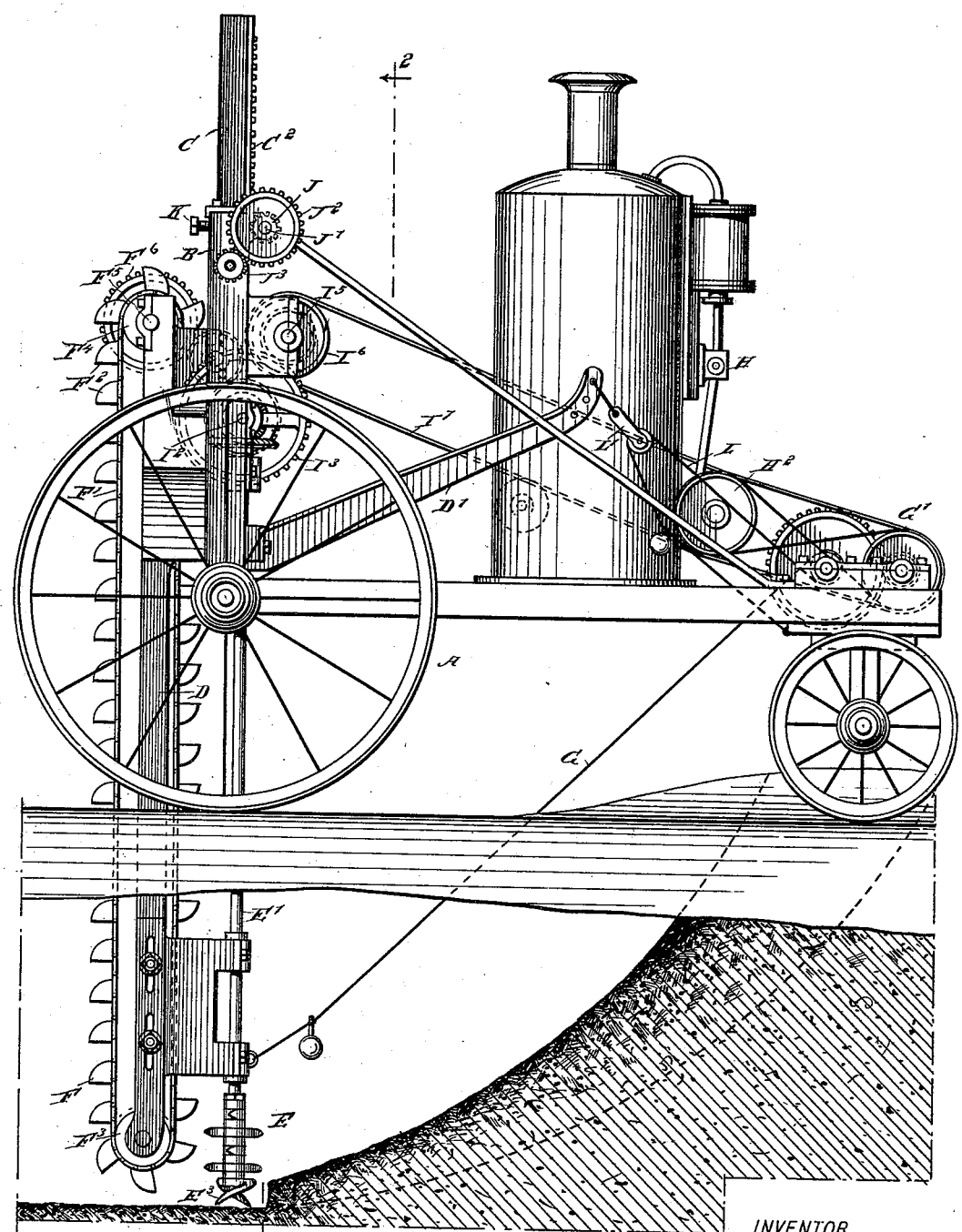

(No Model.) 7 Sheets—Sheet 4.
A. McDONALD.
EXCAVATOR.
No. 547,672. Patented Oct. 8, 1895.
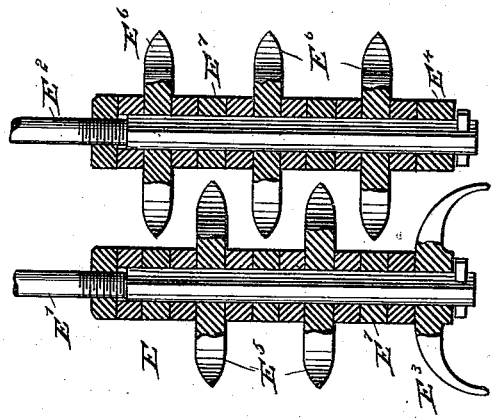
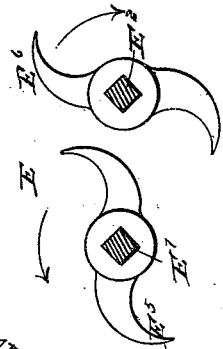
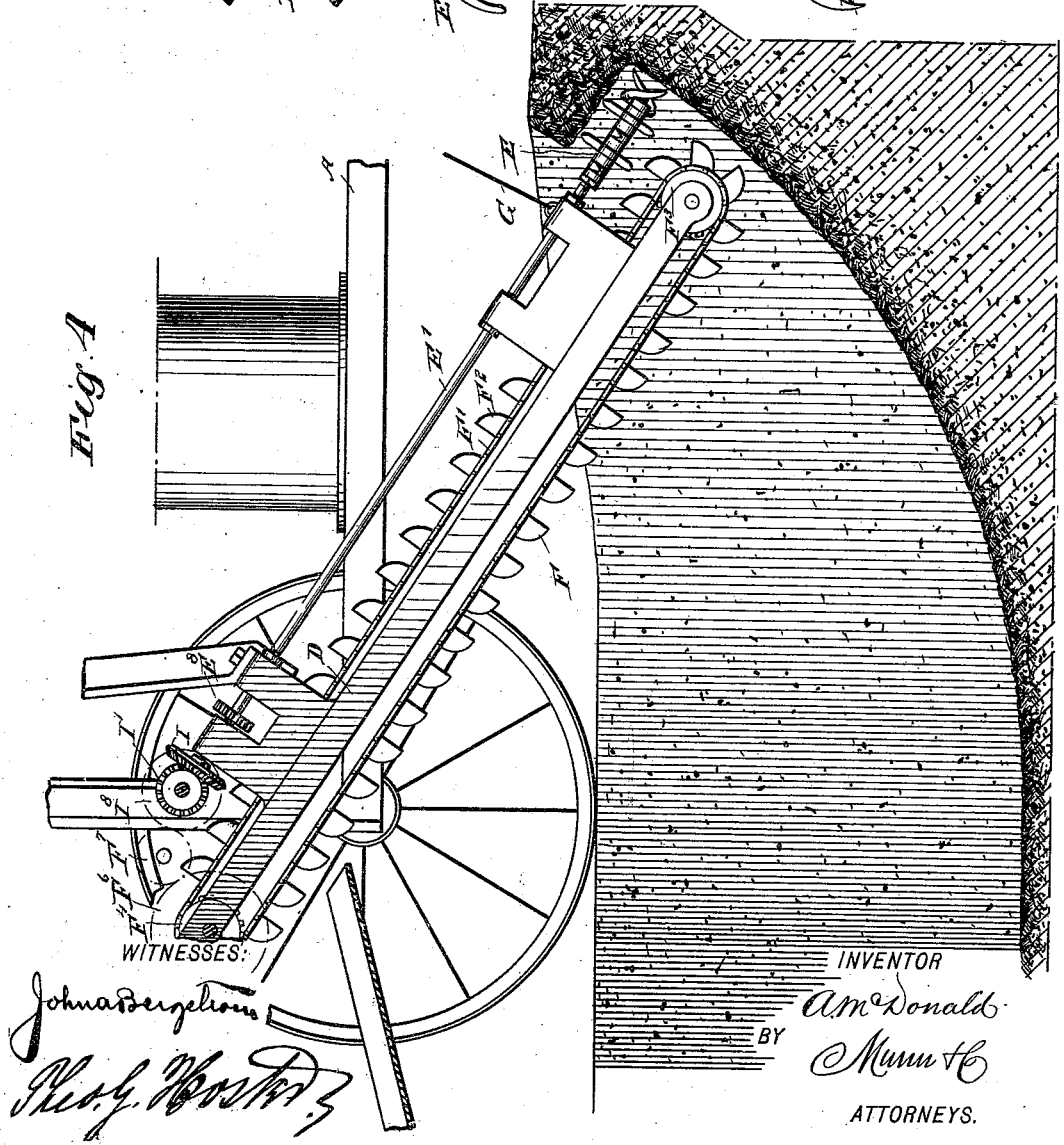
WITNESSES:
INVENTOR
A. McDonald
BY Munn & Co.
ATTORNEYS.

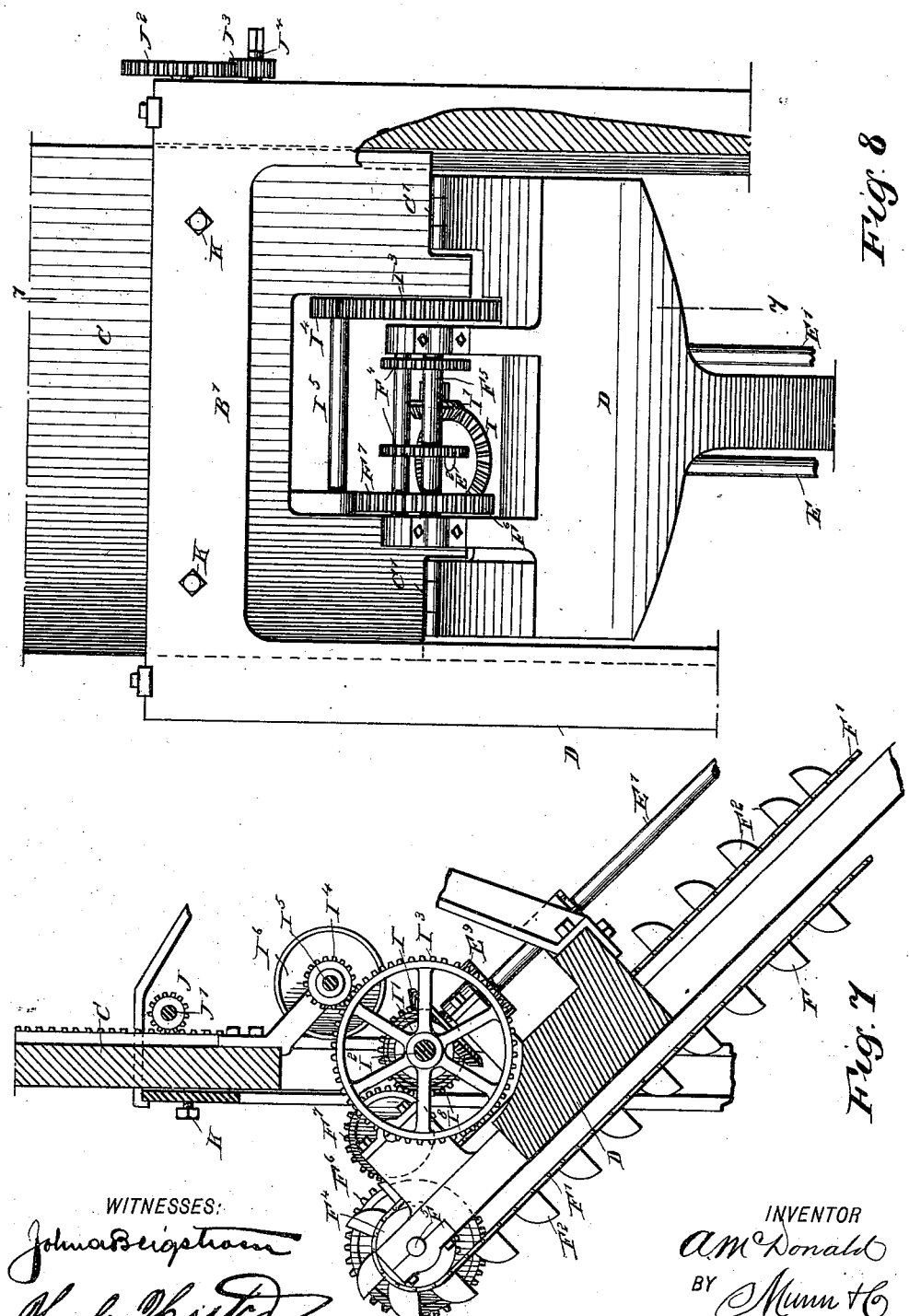

(No Model.) 7 Sheets—Sheet 6.
A. McDONALD.
EXCAVATOR.
No. 547,672. Patented Oct. 8, 1895.

WITNESSES:

INVENTOR
A. McDonald
BY Munn & Co.
ATTORNEYS.

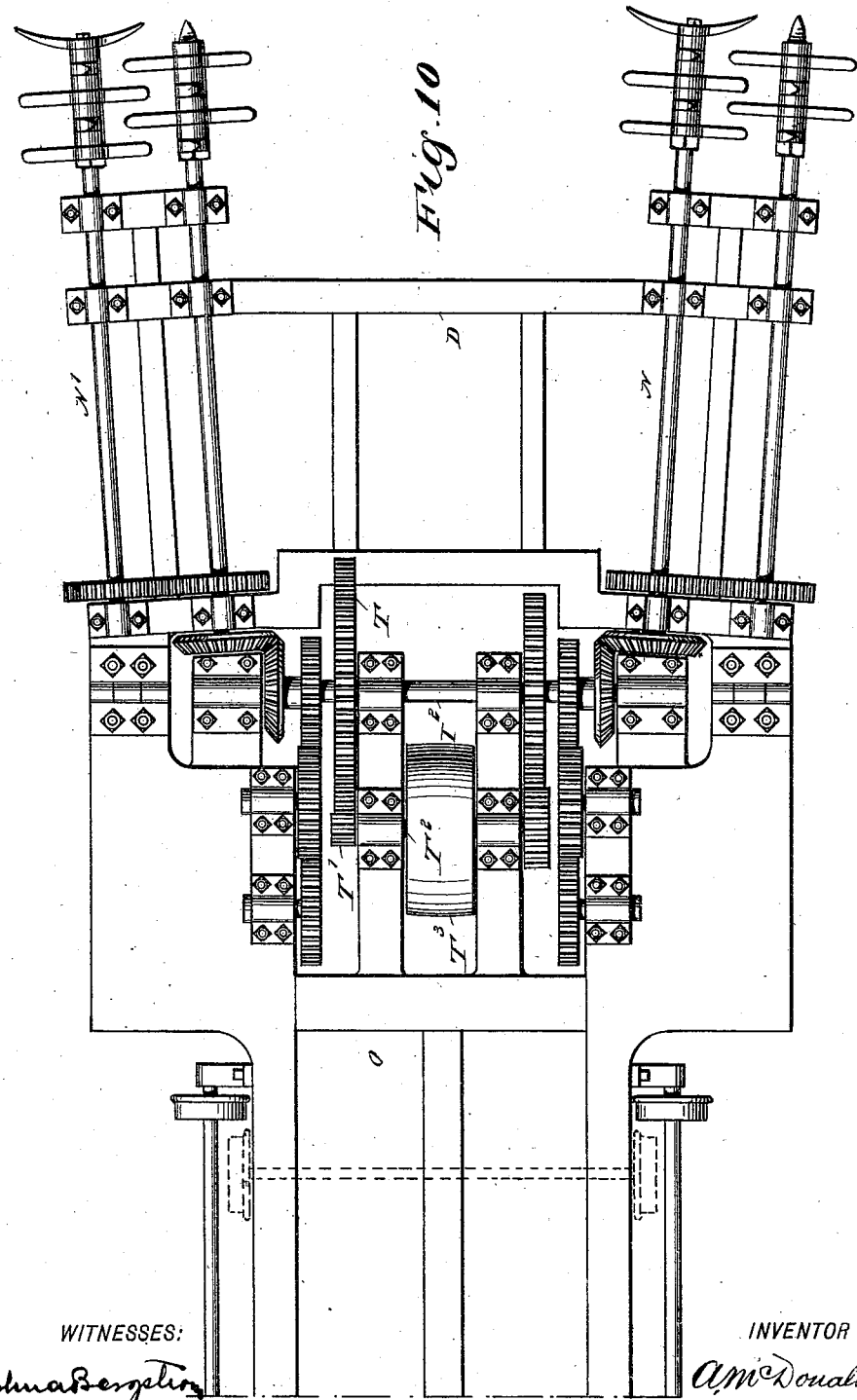

UNITED STATES PATENT OFFICE.

ALEXANDER McDONALD, OF CAMBRIDGE, MASSACHUSETTS.

EXCAVATOR.

SPECIFICATION forming part of Letters Patent No. 547,672, dated October 8, 1895.

Application filed March 18, 1895. Serial No. 542,214. (No model.)

*To all whom it may concern:*

Be it known that I, ALEXANDER MCDONALD, of Cambridge, in the county of Middlesex and State of Massachusetts, have invented a new and Improved Excavator, of which the following is a full, clear, and exact description.

The object of my invention is to provide a new and improved excavator and dredger designed for making tunnels, canals, ditches, &c., in a very simple manner and at a comparatively small expenditure of power.

The invention consists of certain parts and details and combinations of the same, as will be fully described hereinafter and then pointed out in the claims.

Reference is to be had to the accompanying drawings, forming a part of this specification, in which similar letters of reference indicate corresponding parts in all the figures.

Figure 1:
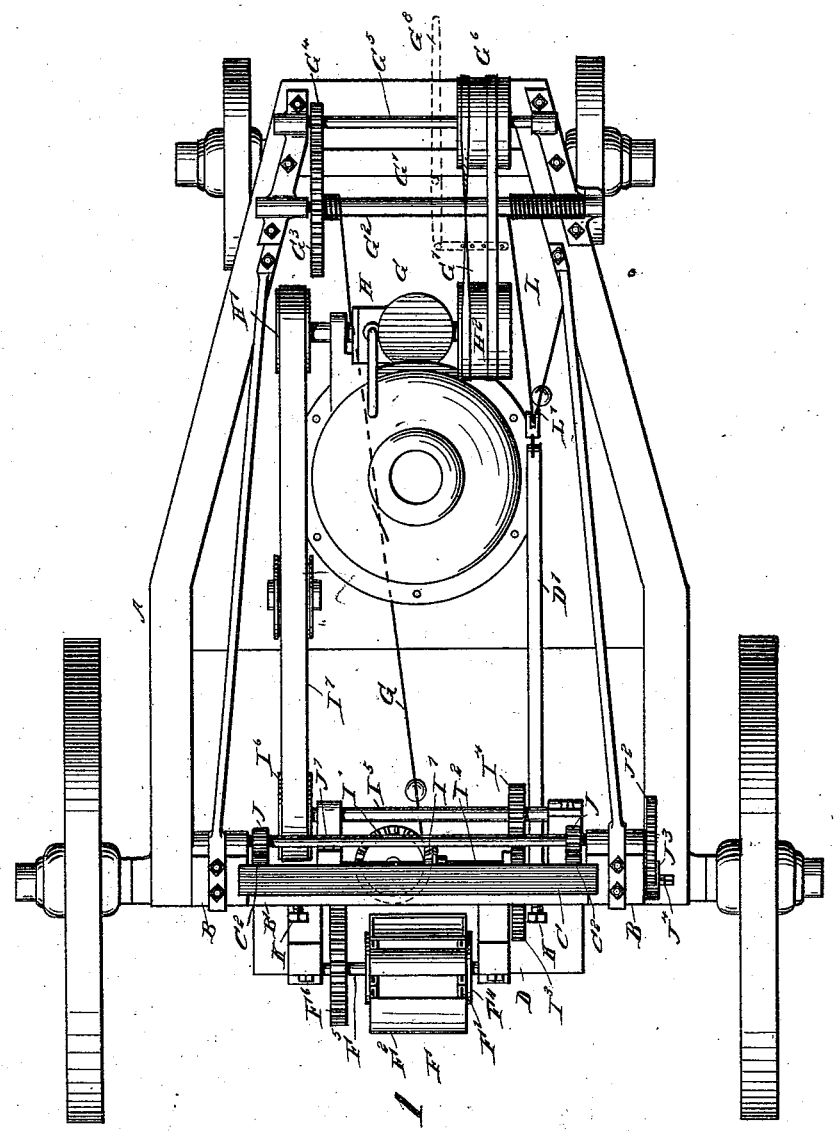
Figure 2:
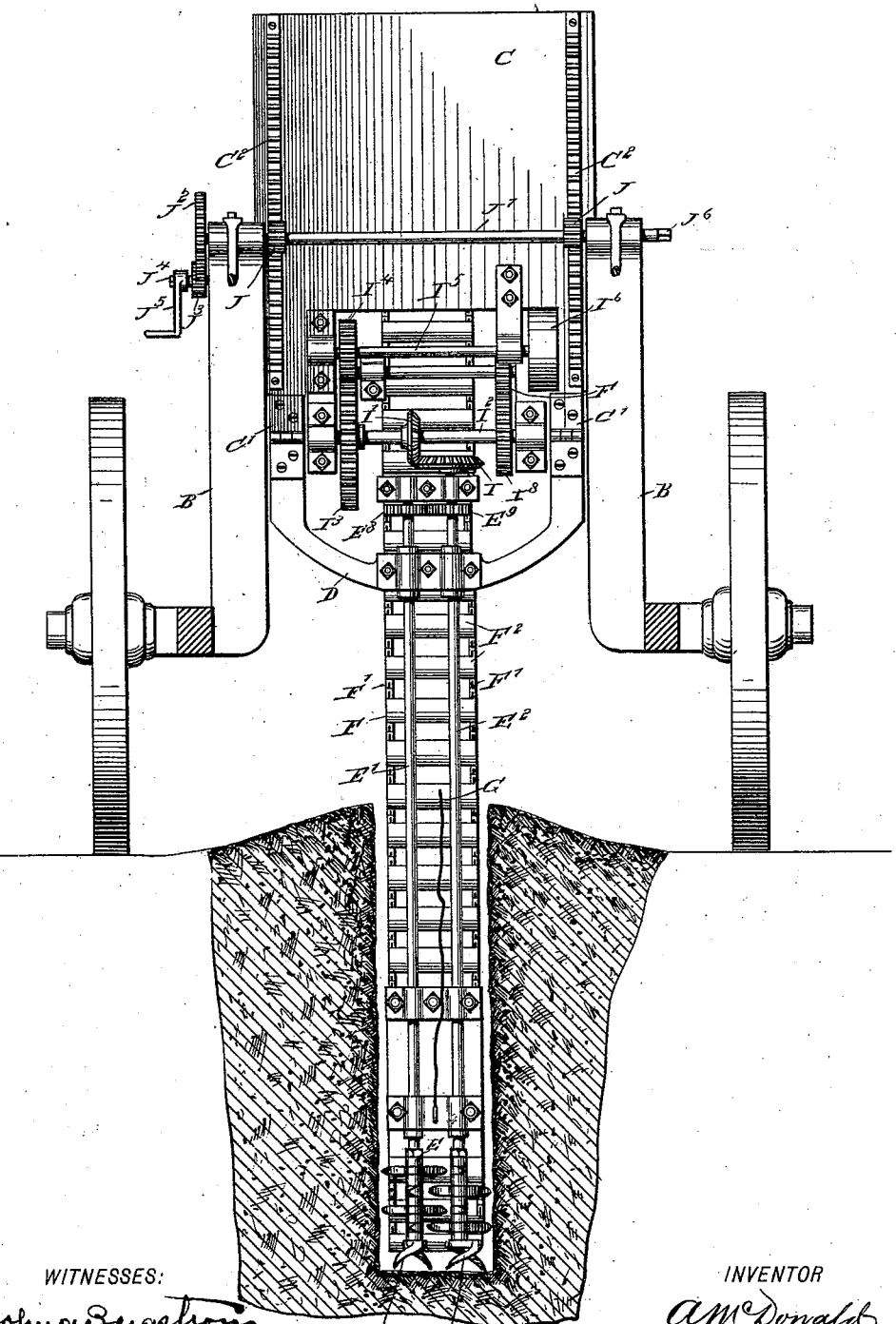
Figure 9:
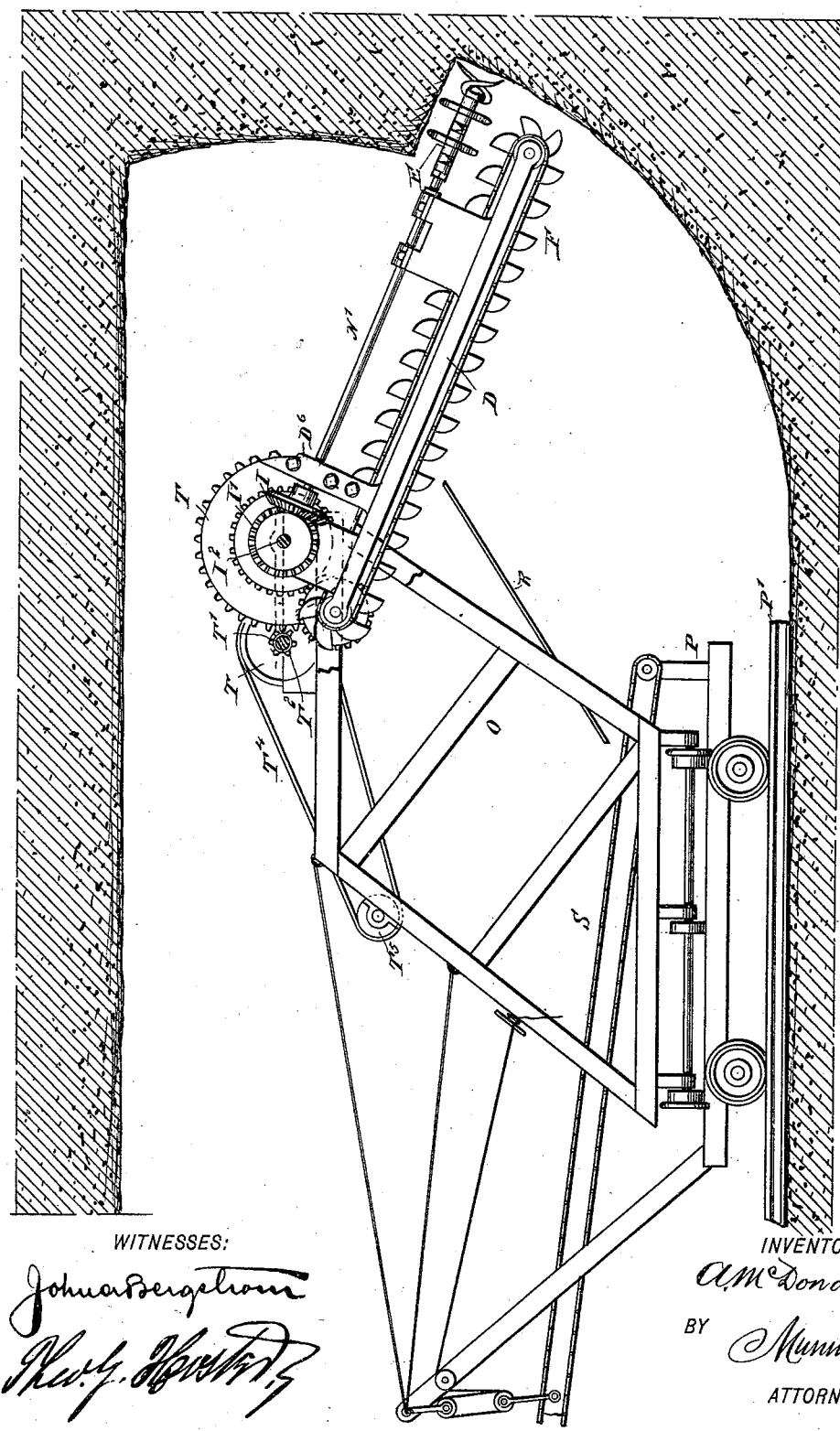

Figure 1 is a plan view of the improvement as arranged for excavating and dredging. Fig. 2 is a cross-section of the same on the line 2 2 of Fig. 3. Fig. 3 is a side elevation of the same at the beginning of the work. Fig. 4 is a sectional side elevation of part of the improvement, showing the picks at work. Fig. 5 is an enlarged sectional side elevation of the revoluble picks. Fig. 6 is a sectional plan view of the same. Fig. 7 is an enlarged side elevation of the driving mechanism, the section being taken on the line 7 7 of Fig. 8. Fig. 8 is a rear end elevation of the same with the carrier omitted. Fig. 9 is a side elevation of the improvement arranged for tunneling, and Fig. 10 is an enlarged plan view of the same.

The improved excavator is provided with a suitable wheeled carriage A, on the rear end of which are erected the guideways B, in which is fitted to slide vertically the slide C, adapted to be fastened on the guideways after being vertically adjusted to the desired position, as hereinafter more fully described. On the lower end of the slide C are arranged hinges C', (see Fig. 2,) connected with a frame D, mounted to swing up and down between the sides of the carriage A, as will be readily understood by reference to Figs. 2 and 4. This swinging frame D supports revoluble picks E and an endless carrier F of the bucket-and-chain kind and arranged in the rear or below the said revoluble picks, so that the material cut and loosened by the picks E falls by its own gravity into the buckets of the carrier F at the time the frame D is swung upward.

In order to raise and lower the frame D, I connect the free end of the frame with a rope or a chain G, extending upwardly and connected with a hoisting device G', of any approved construction, located on the front end of the carriage A and adapted to be driven from an engine H, likewise supported on the carriage, together with the boiler for furnishing the necessary motive agent to actuate the engine H.

The revoluble picks E are preferably made in sets, as illustrated in the drawings, with particular reference to Figs. 5 and 6, the said picks being provided with two parallel shafts E' E², journaled in suitable bearings on the frame D and extending longitudinally thereof. On the outer ends of the shafts E' E² are secured the downwardly-curved picks E³ E⁴, set at angles one to another, so that the shafts E' E² when rotating in unison permit the prongs of the picks to readily pass each other. On the shafts E' E² are further set any desired number of horizontal picks E⁵ E⁶, respectively, held suitable distances apart by intervening washers E⁷ and with the picks E⁵ of the shafts E' alternating with the picks E⁶. The succeeding picks on the shafts are set at right angles to each other, as illustrated in Fig. 6, whereby the shafts E' E² can be placed very close to one another without the picks of the two shafts interfering one with the other.

On the inner ends of the shafts E' E² are secured gear-wheels E⁸ E⁹ in mesh with one another, so that when one shaft is rotated the other shaft rotates in unison with it. On the inner end of the shaft E² (see Fig. 2) is secured a bevel gear-wheel I in mesh with a bevel gear-wheel I', secured on a transversely-extending shaft I², journaled in suitable bearings on the slide C in line with the pintles of the hinges C'. On this shaft I² is secured a large gear-wheel I³ in mesh with a pinion I⁴, fastened on a driving-shaft I⁵, journaled in suitable bearings on the slide C and carrying a pulley I⁶, connected by a belt I⁷ with a pulley H' on the driving-shaft of the engine H. Thus when the engine H is set in motion a rotary motion is imparted to the shaft $I^5$ by the pulleys $H^2 I^6$ and belt $I^7$, and the rotary motion of this shaft $I^5$ is imparted by the pinion $I^4$ and gear-wheel $I^3$ to the shaft $I^2$, which in turn by the bevel gear-wheels $I'$ and $I$ rotates the pick-shaft $E^2$, and as the latter is connected by the gear-wheels $E^9$ and $E^8$ with the other pick-shaft $E'$ the picks on the said shafts are rotated in unison.

The carrier F is provided with a sprocket-chain $F'$ and buckets $F^2$, secured thereon, the said chain passing over the sprocket-wheels $F^3$, journaled in the front end of the frame and over the sprocket-wheels $F^4$, secured on a shaft $F^5$, mounted to turn in suitable bearings at the rear or upper end of the frame D. On this shaft $F^5$ is secured a gear-wheel $F^6$, connected by an intermediate gear-wheel $F^7$ with a gear-wheel $I^8$, attached to the driving-shaft $I^2$, so that the latter when rotated, as previously described, imparts a rotary motion by the gear-wheels $I^8$, $F^7$, and $F^6$ to the shaft $F^5$, whereby the sprocket-chains $F'$ are set in motion, and the buckets filled by the picks E carry the material to the rear end of the machine to finally discharge the material into a wagon, chute, or other suitable device.

In order to bring the picks E and the front end of the carriage F to the proper depth in the ditch to be made, it is necessary to vertically adjust the slide C, and for this purpose I provide the latter, at its front face, with racks $C^2$ in mesh with pinions J, secured on a transversely-extending shaft $J'$, turning in suitable bearings on the guideways B. One outer end of the shaft $J'$ is provided with a gear-wheel $J^2$ in mesh with a pinion $J^3$, secured on a shaft $J^4$, mounted to turn in suitable bearings in one of the guideways B and adapted to carry a crank-arm $J^5$ to permit the operator to turn the said shaft and pinions to impart a rotary motion to the gear-wheel $J^2$ and shaft $J'$, so that the pinions in mesh with the racks $C^2$ cause the slide C to move down or up in the guideways B, according to the direction in which the crank-arm $J^5$ is turned. If desired, the crank-arm $J^5$ may be applied directly on the outer square end $J^6$ of the shaft $J'$.

In order to secure the slide C in place after it is adjusted vertically in the guideways, I provide screws K, screwing in the transverse bar $B'$, connecting the upper ends of the guideways B with each other.

In order to steady the frame D while the latter swings up or down, I provide a rope or chain L, winding on the shaft $G^2$ of the hoisting device $G'$ in an opposite direction to the winding of the rope or chain G. (See Fig. 1.) This rope L extends from the shaft $G^2$ over a sheave $L'$, hung on a post $D'$, projecting at an angle from the frame D, as is plainly shown in the drawings, and the rope L after leaving the sheave $L'$ extends downward and connects with an eye or other device attached to the carriage A. The shaft $G^2$ of the hoisting device $G'$ is connected by a gear-wheel $G^3$ with a pinion $G^4$, attached to the driving-shaft $G^5$, having forward and reversing pulleys $G^6$, connected by belts $G^7$ with forward and reversing pulleys $H^2$ on the driving-shaft of the engine H. A suitable shifting-fork $G^8$ serves to manipulate the belts $G^7$, so as to cause a forward or reversing motion of the said shafts $G^5$ and $G^2$.

When the machine commences to work, the frame D stands in a vertical position, as illustrated in Fig. 3, it being understood that the frame D has been fed downward the desired distance by the operator turning the crank-arm $J^5$ to impart a downward-sliding motion to the slide C, as previously described, and after the adjustment has been made the slide C is fastened in place by the screws K. The operator now starts the engine H and connects the engine with the hoisting device $G'$ by the shifting-lever $G^8$, whereby the picks E are rotated, and a traveling motion is imparted to the carrier and an upward-swinging motion is given to the frame D. Thus the picks E cut into the ground, loosen the same, and permit the loosened ground to discharge directly into the buckets of the carrier F, the material readily passing by its own gravity into the said buckets to be carried off by the latter to a place of discharge at the top rear end of the frame D. The carriage A may be moved forward at the same time to cause the revoluble picks to enter the ground to the full depth of the picks, so that a large amount of material is cut and removed during one upward-swinging motion of the frame D.

Thus it will be seen that by the arrangement described a segmental cut is made in the ground from a vertical to an approximately horizontal position assumed by the frame D. After the cut is made the hoisting device $G'$ is reversed by shifting the fork $G^8$ correspondingly, so that the ropes G and L lower the frame D until the latter assumes again a vertical position. The carriage A is then again moved forward and a new cut is made in the manner above described.

As illustrated in Figs. 9 and 10, the machine is arranged for tunneling purposes, and in this case I provide the frame D with two sets N N' of revoluble picks and endless carriers, both sets being, however, alike in construction and similar to the one described above, the only difference being that the shafts and carriers extend obliquely, as plainly indicated in Fig. 10. The frame D is hinged upon a wheeled frame O, mounted to travel transversely on a carriage P, adapted to be moved forward on suitable rails P', which are laid in the tunnel as the work progresses. A chute R serves to carry the material discharged by the buckets of the two sets N N' of picks and carriers upon an endless carrier S, extending upwardly, so that the material removed in the tunnel by the two sets of picks and carriers is discharged upon cars traveling on the rails P', and serving to carry the material to a place outside of the tunnel.

It will be seen that the machine can be used for making ditches, canals, tunnels, &c., and, if desired, it may be used for boring holes in the ground, and in this case it is necessary to swing the frame back of the perpendicular when lowering the slide C, so that the picks will loosen the earth before the buckets come in contact with it. It is necessary to keep the picks and buckets going all of the time coming back from the horizontal to the vertical position. The buckets take up all of the loose earth that is spilled over when the buckets are coming up, so that each cut is cleaned up before a new one is commenced.

Instead of imparting a swinging motion to the frame D by the ropes and hoisting-gear, as described in reference to Fig. 1, 2, and 3, gearing is employed and provided with a gear-wheel T, held loosely on the front shaft I², but attached to an arm D⁶ on the frame D, as shown in Figs. 9 and 10. A pinion T' is in mesh with the gear-wheel T and is secured on a shaft T², journaled in the frame O and carrying a pulley T³, connected by a belt T⁴ with a pulley T⁵, adapted to be turned either by hand or power, as desired, to impart an up-and-down swinging motion to the frame D. By having two sets of revoluble picks and carriers, as described, and moving the same transversely after a cut is made the entire width of the tunnel is excavated, and by setting the sets of picks and carriers obliquely, as described and shown, the machinery does not come in contact with the sides of the tunnel.

It is expressly understood that by my method of excavating the material is undermined by the picks, and consequently the loosened material falls by its own gravity into the buckets of the carrier. It is further understood that the frame D can be swung above a horizontal line, so that material can be removed at any desired height.

Having thus fully described my invention, I claim as new and desire to secure by Letters Patent—

1. An excavator, provided with one or more revoluble picks on parallel shafts mounted on a supporting frame for cutting and loosening the material, and an endless carrier into which the material as it is loosened by the picks falls by its own gravity, to be carried off and discharged, substantially as shown and described.

2. An excavator having in combination with a swinging supporting frame, a set of revoluble picks comprising two shafts, the said shafts being arranged in a plane parallel to a chord of an arc of the circle in which the shafts swing, and geared together to rotate in unison, and picks secured to said shafts, substantially as shown and described.

3. An excavator, provided with a set of revoluble picks comprising two shafts geared together and mounted on a swinging frame to rotate in unison in opposite directions, and picks secured on the said shafts, the picks on one shaft being arranged alternately and at angles with the picks on the other shaft, substantially as shown and described.

4. An excavator, comprising a vertically movable slide frame a frame mounted on said slide frame to swing above and below its pivotal point, revoluble picks mounted to turn on the said frame, and an endless carrier mounted on the said frame under the said picks, to intercept and receive the material loosened by the said picks, substantially as shown and described.

5. An excavator, comprising a carriage having vertical guideways, a slide held adjustable in the said guideways, a frame hinged on the said slide, picks mounted to turn on the said frame, and an endless carrier mounted on the said frame underneath the said picks, to intercept and receive the material loosened by the said picks, substantially as shown and described.

6. An excavator, comprising a carriage having vertical guideways, a slide adjustable in said guideways, a frame mounted to swing, revoluble picks mounted to turn on the said frame, an endless carrier mounted on the said frame under the said picks, to intercept and receive the material loosened by the said picks, and means, substantially as described, for imparting an up and down swinging motion to the said frame, as set forth.

7. An excavator, comprising a vertically adjustable slide frame a frame mounted to swing on said slide frame, revoluble under cutting picks mounted to turn on the said frame, an endless carrier mounted on the said frame under the plane of said picks, to intercept and receive the material loosened by the said picks, and means, substantially as described, for imparting a simultaneous rotary motion to the said picks, and a traveling motion to the said carrier, as set forth.

8. An excavator, comprising a carriage having vertical guideways, a slide held adjustable in the said guideways, a frame hinged on the said slide, revoluble picks mounted on the said frame, an endless carrier mounted on the said frame underneath the said picks, to intercept and receive the material loosened by the said picks, and means, substantially as described, for raising or lowering the said slide in its bearings, as set forth.

9. An excavator, comprising two carriages, one of which is mounted to travel transversely in the other, a frame hinged on the transverse moving carriage, two sets of revoluble picks mounted on the said frame and projecting obliquely beyond the sides of the frame, and an endless carrier for each set of revoluble picks, substantially as shown and described.

10. An excavator, comprising two carriages, one of which is mounted to travel transversely in the other, a frame hinged on the transverse moving carriage, two sets of revoluble picks mounted on the said frame and projecting obliquely beyond the sides of the frame, an endless carrier for each set of revoluble picks, and means for imparting a simultaneous motion to the frame, picks and carriers, as set forth.

ALEXANDER McDONALD.

Witnesses:
FRANK R. McDONALD,
JAMES A. PIERCE.